(12) United States Patent
Liang et al.

(10) Patent No.: US 12,343,925 B2
(45) Date of Patent: Jul. 1, 2025

(54) MULTI-FILAMENT HELICAL WINDING DEVICES

(71) Applicant: TAIYUAN UNIVERSITY OF TECHNOLOGY, Shanxi (CN)

(72) Inventors: Jianguo Liang, Taiyuan (CN); Xiaodong Zhao, Taiyuan (CN); Lianyun Jiang, Taiyuan (CN); Lihua Liu, Taiyuan (CN); Zelin Qin, Taiyuan (CN); Yujie Duan, Taiyuan (CN); Zhaotun Jia, Taiyuan (CN)

(73) Assignee: TAIYUAN UNIVERSITY OF TECHNOLOGY, Taiyuan (CN)

( * ) Notice: Subject to any disclaimer, the term of this patent is extended or adjusted under 35 U.S.C. 154(b) by 593 days.

(21) Appl. No.: 17/805,024

(22) Filed: Jun. 1, 2022

(65) Prior Publication Data

US 2022/0388228 A1    Dec. 8, 2022

(30) Foreign Application Priority Data

Jun. 7, 2021   (CN) .......................... 202110633544.1
Jun. 7, 2021   (CN) .......................... 202110633568.7

(51) Int. Cl.
*B29C 53/00*      (2006.01)
*B29C 53/58*      (2006.01)
(Continued)

(52) U.S. Cl.
CPC .......... *B29C 53/8016* (2013.01); *B29C 53/58* (2013.01); *B65H 57/006* (2013.01);
(Continued)

(58) Field of Classification Search
CPC .. B65H 57/006; B65H 57/16; B65H 2403/41; B65H 2403/46; B29C 53/8016; B29C 53/58
See application file for complete search history.

(56) References Cited

U.S. PATENT DOCUMENTS 4,217,158 A    8/1980 Puck
4,323,408 A    4/1982 Dana et al.
(Continued)

FOREIGN PATENT DOCUMENTS

CN    2497900 Y    7/2002
CN    1850499 A    10/2006
(Continued)

OTHER PUBLICATIONS

First Office Action in Chinese Application No. 202110633544.1 mailed on Mar. 8, 2022, 9 pages.
(Continued)

*Primary Examiner* — Emmanuel M Marcelo
(74) *Attorney, Agent, or Firm* — METIS IP LLC

(57) ABSTRACT

The present disclosure provides a multi-filament helical winding device. The device includes a frame, a multi-filar guide radial telescopic portion, a multi-filar guide rotation portion. The multi-filar guide radial telescopic portion and the multi-filar guide rotation portion are arranged on the frame, and the multi-filar guide radial telescopic portion is connected to the multi-filar guide rotation portion. A count of the multi-filar guide radial telescopic portion is the same as a count of the multi-filar guide rotation portion, and the multi-filar guide radial telescopic portion corresponds to the multi-filar guide rotation portion one by one. The multi-filar guide radial telescopic portion includes a first telescopic mechanism or a second telescopic mechanism. The multi-filar guide rotation portion includes a first rotation mechanism or a second rotation mechanism.

12 Claims, 9 Drawing Sheets

(51) Int. Cl.
  *B29C 53/80* (2006.01)
  *B65H 57/00* (2006.01)
  *B65H 57/16* (2006.01)
(52) U.S. Cl.
  CPC ......... *B65H 57/16* (2013.01); *B65H 2403/41* (2013.01); *B65H 2403/46* (2013.01)

(56) References Cited

U.S. PATENT DOCUMENTS

| | | | |
|---|---|---|---|
| 4,521,270 | A | 6/1985 | Lupke |
| 6,637,092 | B1 | 10/2003 | Menzel |
| 11,511,476 | B1 * | 11/2022 | Liang ..................... B29C 53/58 |
| 2002/0139430 | A1 | 10/2002 | Amano et al. |
| 2009/0065622 | A1 | 3/2009 | Uozumi et al. |
| 2009/0127373 | A1 | 5/2009 | Uozumi et al. |
| 2015/0266232 | A1 | 9/2015 | Tanigawa et al. |
| 2019/0039330 | A1 | 2/2019 | Tanigawa et al. |
| 2020/0299098 | A1 | 9/2020 | Tanigawa et al. |

FOREIGN PATENT DOCUMENTS

| | | | | |
|---|---|---|---|---|
| CN | 101680119 A | * | 3/2010 | ............ B65H 51/08 |
| CN | 102632609 A | | 8/2012 | |
| CN | 202556721 U | | 11/2012 | |
| CN | 202764199 U | | 3/2013 | |
| CN | 103009614 A | | 4/2013 | |
| CN | 103153590 A | * | 6/2013 | ......... B29C 53/8016 |
| CN | 103753803 A | | 4/2014 | |
| CN | 104736325 A | | 6/2015 | |
| CN | 104859134 A | | 8/2015 | |
| CN | 105415653 A | | 3/2016 | |
| CN | 105531098 A | * | 4/2016 | ............ B29C 53/68 |
| CN | 107283783 A | | 10/2017 | |
| CN | 107448772 A | | 12/2017 | |
| CN | 110014636 A | | 7/2019 | |
| CN | 110466140 A | | 11/2019 | |
| CN | 110815801 A | | 2/2020 | |
| CN | 111212725 A | * | 5/2020 | ........... B29C 53/566 |
| CN | 112140579 A | | 12/2020 | |
| CN | 113260589 A | * | 8/2021 | ............ B29C 53/58 |
| CN | 113334750 A | | 9/2021 | |
| CN | 113336002 A | | 9/2021 | |
| EP | 2532507 A2 | | 12/2012 | |
| JP | 2013142431 A | | 7/2013 | |
| JP | 2015199198 A | | 11/2015 | |
| PT | 1574319 E | | 1/2007 | |
| WO | 9832589 A1 | | 7/1998 | |
| WO | 2021087150 A1 | | 5/2021 | |

OTHER PUBLICATIONS

First Office Action in Chinese Application No. 202110633568.7 mailed on Feb. 2, 2022, 10 pages.

* cited by examiner

MULTI-FILAMENT HELICAL WINDING DEVICES

CROSS-REFERENCE TO RELATED APPLICATIONS

This application claims the priority of Chinese Patent Application No. 202110633544.1, filed on Jun. 7, 2021 and the priority of Chinese Patent Application No. 202110633568.7, filed on Jun. 7, 2021, the entire contents of which are incorporated herein by reference.

TECHNICAL FIELD

The present disclosure relates to the technical field of filament winding, and in particular, to multi-filament helical winding devices.

BACKGROUND

Filament reinforced composite materials have characteristics such as light weight, excellent mechanical properties, corrosion resistance, and high temperature resistance, so the filament reinforced composite materials are widely used in various industries such as national defense, aviation, aerospace, ships, and submersibles, which have made great contributions to national security, national science and technology and national economy.

A filament winding process is a molding process of the filament reinforced composite material, which has advantages of easy mechanization and automation, great comprehensive performance of molded products, and flexible shape of molded workpieces. Therefore, the filament winding process has become the most widely used molding process of filament reinforced composites. A filament winding device is a specific way to realize the filament winding process, and the filament winding device greatly determines the mechanical properties of a filament winding product. A filament helical winding device plays an extremely important role in the filament winding process.

Therefore, it is desirable to provide a multi-filament helical winding device.

SUMMARY

One aspect of some embodiments of the present disclosure provides a multi-filament helical winding device. The device includes a frame, a multi-filar guide radial telescopic portion, a multi-filar guide rotation portion. The multi-filar guide radial telescopic portion and the multi-filar guide rotation portion are arranged on the frame, and the multi-filar guide radial telescopic portion is connected to the multi-filar guide rotation portion. A count of the multi-filar guide radial telescopic portion is the same as a count of the multi-filar guide rotation portion, and the multi-filar guide radial telescopic portion corresponds to the multi-filar guide rotation portion one by one. The multi-filar guide radial telescopic portion includes a first telescopic mechanism or a second telescopic mechanism. The multi-filar guide rotation portion includes a first rotation mechanism or a second rotation mechanism.

In some embodiments, the first telescopic mechanism may include a second driving portion, a first transmission mechanism, and a first shifting fork, and the first rotation mechanism may include a first driving portion, a second transmission mechanism, a filar guide, and a first clamp. The first telescopic mechanism may drive the filar guide to perform telescopic movement through the first transmission mechanism by the second driving portion, and the first rotation mechanism may drive the filar guide to rotate through the second transmission mechanism by the first driving portion. The first shifting fork of the first telescopic mechanism may be connected to the first clamp of the first rotation mechanism.

In some embodiments, the first transmission mechanism may include a third gear, a second big outer ring gear, a second inner support ring, a second big inner ring gear, a fourth gear, a second shaft, a fifth gear, and a rack. An output shaft of the second driving portion may be connected to the third gear. The third gear may be meshed with the second big outer ring gear, and the second big outer ring gear may be connected to the second inner support ring. The second inner support ring and the frame may be fixed through a thread connection, and the second big outer ring gear and the second big inner ring gear may be fixed through the thread connection. The second big inner ring gear may be meshed with the fourth gear, and the fourth gear may be connected to the second shaft. The second shaft may be connected to the fourth gear, and the fifth gear may be meshed with the rack. One end of the rack may be mounted in a slideway of the frame, and other end of the rack may be provided with the first shifting fork.

In some embodiments, the second transmission mechanism may include a first gear, a first big outer ring gear, a first inner support ring, a first big inner ring gear, a second gear, a first shaft, and a first worm gear. The first driving portion may be mounted in the frame. An output shaft of the first driving portion may be connected to the first gear by a key and a keyway. The first gear may be meshed with the first big outer ring gear, and the first big outer ring gear may be connected to the first inner support ring. The first inner support ring and the frame may be fixed through a thread connection, the first big outer ring gear and the first big inner ring gear may be fixed through the thread connection. The first big inner ring gear may be meshed with the second gear, and the second gear and the first shaft may be connected by a key and a keyway. One end of the first shaft may be processed into a worm. The worm of the first shaft may be connected to the first worm gear, the first worm gear may be connected to the filar guide through a spline, and the first clamp may be mounted at end of the filar guide.

In some embodiments, the filar guide may be evenly distributed in a circumference around a third shaft.

In some embodiments, the second big outer ring gear and the second inner support ring may be mounted coaxially, and the first big outer ring gear and the first inner support ring may be mounted coaxially.

In some embodiments, the output shaft of the second driving portion and the third gear may be connected by a key and a keyway, the fourth gear and the second shaft may be connected by the key and the keyway, and the second shaft and the fifth gear may be connected by the key and the keyway.

In some embodiments, the second telescopic mechanism may include a plurality of filar guide radial telescopic mechanisms, and the plurality of the filar guide radial telescopic mechanisms may be evenly distributed on the frame in a circumference. Each filar guide radial telescopic mechanism in the plurality of the filar guide radial telescopic mechanisms may include a third driving portion, a third transmission mechanism, and a second clamp. The second rotation mechanism may include a plurality of filar guide circumferential rotation mechanisms, and the plurality of filar guide circumferential rotation mechanisms may be evenly distributed on the frame in the circumference. Each filar guide circumferential rotation mechanism in the plurality of filar guide circumferential rotation mechanisms may include a filar guide, a fourth driving portion, a fourth transmission mechanism, and a second shifting fork. The second telescopic mechanism may drive the filar guide to perform telescopic movement through the third transmission mechanism by the third driving portion, and the second rotation mechanism may drive the filar guide to rotate through the fourth transmission mechanism by the fourth driving portion. The filar guide radial telescopic mechanism may be parallel to the filar guide circumferential rotation mechanism, and the second shifting fork of the filar guide circumferential rotation mechanism may be connected to the second clamp of the filar guide radial telescopic mechanism.

In some embodiments, the third transmission mechanism may include a first worm, a third big outer ring gear, a first rotary structure member, a third big inner ring gear, a sixth gear, a fourth shaft, a first bevel gear, a second bevel gear, a screw rod, a sixth shaft, and a screw nut. The third driving portion may be mounted in the frame, and an output shaft of the third driving portion and the first worm may be connected by a key and a keyway or other means. The first worm may be meshed with the third big outer ring gear, and the third big outer ring gear may be mounted coaxially with the first rotary structure member. The first rotary structure member and the frame may be fixed through a thread connection, and the third big outer ring gear and the third big inner ring gear may be fixed through the thread connection. The third big inner ring gear may be meshed with the sixth gear, and the sixth gear and the fourth shaft may be connected by the key and the keyway. Other end of the fourth shaft may be connected to the first bevel gear, and the first bevel gear may be meshed with the second bevel gear. The second bevel gear and the screw rod may be connected by the spline, ends of the sixth shaft may be provided with a second clamp, and the screw nut and the second bevel gear may be fixedly mounted.

In some embodiments, the fourth transmission mechanism may include a second worm, a fourth big outer ring gear, a second rotary structure member, a fourth big inner ring gear, a guide ring of the fourth big inner ring gear ring, a seventh gear, a fifth shaft, a third bevel gear, a fourth bevel gear, a motor, and a ball screw. The fourth driving portion may be mounted in the frame, and an output shaft of the fourth driving portion may be connected to the second worm through a key and a keyway. The second worm may be meshed with the fourth big outer ring gear, and the fourth big outer ring gear and the second rotating structure member may be mounted coaxially. The second rotating structure member and the frame may be fixed through a thread connection. A plurality of shafts may be processed along the circumference in a direction perpendicular to a surface of the guide ring of the fourth big inner ring gear ring. The fourth big inner ring gear and the guide ring of the fourth big inner ring gear ring may be mounted coaxially. The motor may be mounted on the fourth big inner ring gear, and the motor may be connected to the ball screw. The motor may drive the ball screw to rotate, and the ball screw may drive the fourth big inner ring gear to reciprocate along a guide shaft. The fourth big inner ring gear may be meshed with the seventh gear. The seventh gear may be evenly distributed in the circumference, and the seventh gear and the fifth shaft may be connected by the key and the keyway. Other end of the fifth shaft may be provided with the third bevel gear, and the third bevel gear may be meshed with the fourth bevel gear.

The fourth bevel gear may be mounted in the filar guide, and ends of the filar guide may be provided with the second shifting fork.

In some embodiments, the seventh gear may be a gear with different gear width.

In some embodiments, the fifth shaft and the third bevel gear may be connected by the key and the keyway.

In some embodiments, both the third driving portion and the fourth driving portion may use servo motors.

In some embodiments, a bottom of the frame may be provided with a fixing device, the fixing device includes a base, a first movable seat, a second movable seat, a third movable seat, a first traveling mechanism, a second traveling mechanism, a third traveling mechanism, a first gripper, a second gripper, a rotating motor, a buckle, a first guide rail, a second guide rail, a third guide rail, and a conveyor belt. The frame may be fixed on the base. The first movable seat and the second movable seat may be respectively fixed on both sides of the frame. The first movable seat may be provided with the first guide rail, and the first travelling mechanism may be slidably connected to the first guide rail. The first movable seat may be connected to the first travelling mechanism through worm gears. The first travelling mechanism may be provided with the first gripper, and the first gripper may be fixedly connected to a rotating shaft of the rotating motor. The second movable seat may be provided with the second guide rail. The second traveling mechanism may be slidably connected to the second guide rail. The second movable seat may be connected to the second traveling mechanism through the worm gears, and the second traveling mechanism may be provided with the second gripper. A workpiece may be clamped between the first gripper and the second gripper. The third movable seat may be arranged on one side of the first movable seat and one side of the second movable seat. The third movable seat may be provided with the third guide rail. A direction of the first guide rail may be the same as a direction of the second guide rail. The direction of the first guide rail may be perpendicular to the direction of the third guide rail. The third traveling mechanism may be slidably connected to the third guide rail. The third travelling mechanism may be provided with the conveyor belt, and the conveyor belt may be provided with the buckle.

BRIEF DESCRIPTION OF THE DRAWINGS

The present specification will be further described in the way of exemplary embodiments, which will be described in detail with the drawings. These embodiments are not limited, in these embodiments, the same numbers denote the same structures, wherein.

DETAILED DESCRIPTION

Figure 1:
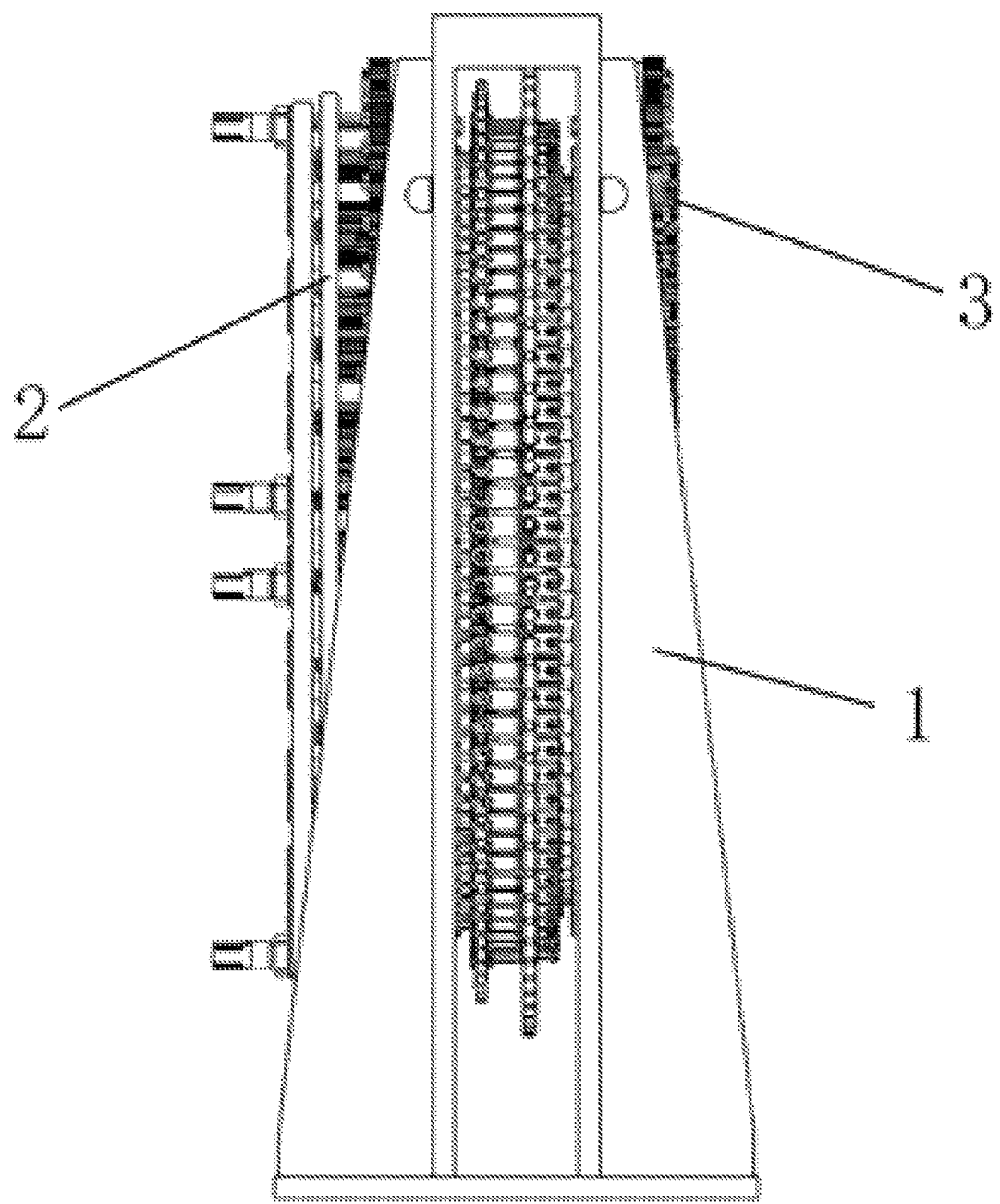
FIG. 1 is a structural diagram of a multi-filament helical winding device according to some embodiments of the present disclosure.

To illustrate the technical solutions of the embodiments of the present disclosure more clearly, the following briefly introduces the accompanying drawings used in the description of the embodiments. Obviously, the drawings in the following description are only some examples or embodiments of the present disclosure, and for those ordinary skilled in the art, without creative efforts, may apply the present disclosure to other similar situations according to these drawings. Unless obviously obtained from the context or the context illustrates otherwise, the same numerals in the drawings refers to the same structures or operations.

As shown in the present disclosure and claims, unless the context clearly dictates otherwise, the words "a", "an" and/or "the" are not intended to be specific in the singular and may include the plural. Generally speaking, the terms "comprise" and "include" only imply that the clearly identified steps and elements are included, and these steps and elements do not constitute an exclusive list, and the method or apparatus may also include other steps or elements.

Filament winding technology is the most widely used automated forming technology for composite materials. A helical winding process is to lead out the filament bundles through the filar guide, and wind and fix the filament bundles on the surface of the workpiece to be wound (or referred to as a workpiece).

FIG. 1 is a structural diagram of a multi-filament helical winding device according to some embodiments of the present disclosure.

As shown in FIG. 1, some embodiments of the present disclosure provide a multi-filament helical winding device, which may include a frame 1, a multi-filar guide rotation portion 2, and a multi-filar guide radial telescopic portion 3, the multi-filar guide radial telescopic portion 3 and the multi-filar guide rotation portion 2 may be arranged on the frame 1, and the multi-filar guide rotation portion 2 may be connected to the multi-filar guide radial telescopic portion 3, a count of the multi-filar guide radial telescopic portion 3 may be the same as a count of the multi-filar guide rotation portion 2, and the multi-filar guide radial telescopic portion 3 may correspond to the multi-filar guide rotation portion 2 one by one. In some embodiments, the multi-filar guide radial telescopic portion 3 may include a first telescopic mechanism or a second telescopic mechanism, the multi-filar guide rotation portion 2 may include a first rotation mechanism or a second rotation mechanism. In some embodiments, the multi-filar guide radial telescopic portion 3 may include a first telescopic mechanism and a second telescopic mechanism, the multi-filar guide rotation portion 2 may include a first rotation mechanism and a second rotation mechanism. In some embodiments, the first telescopic mechanism and the second telescopic mechanism may be telescopic mechanisms with two different structures, and the first rotation mechanism and the second rotation mechanism may be rotating mechanisms with two different structures, more descriptions may be found elsewhere in the present disclosure, e.g., FIGS. 2 and 5 and the relevant descriptions thereof.

In some embodiments, the frame 1 may be used to support a multi-filament helical winding device. In some embodiments, the frame 1 may be a load-bearing structure capable of supporting, for example, a triangular bracket, a trapezoidal bracket, a tower bracket, or the like.

In some embodiments, the multi-filar guide rotation portion 2 may be used to drive two or more filar guides 209 to rotate simultaneously, for example, clockwise rotation (or forward rotation) or counterclockwise rotation (or reverse rotation). The filar guide 209 (or a filar guide 13) may be used to guide the filaments, and the filament bundles may be extended out through the filar guide 209, the direction of the filament may be adjusted by adjusting the position of the filar guide 209, so that the filaments may be wound more tightly and evenly on the workpiece. In some embodiments, an outlet of the filar guide 209 may be adapted to a cross-section of the filament, and a filar guide 209 may extend smoothly a filament bundle. In some embodiments, multiple filar guides 209 may be arranged on the multi-filar guide rotation portion 2, and multi-filaments may be extended out simultaneously. In some embodiments, the multi-filar guide radial telescopic portion 3 may be used to drive the filar guide 209 to perform radially telescopic movement. The radial direction may refer to a direction perpendicular to the axis of the workpiece and the radially telescopic movement may refer to movement toward or away from an outer wall of the workpiece. By driving the filar guide 209 to perform radially telescopic movement, a distance between the filar guide 209 and the outer wall of the workpiece may be adjusted according to an outer diameter curvature of the workpiece, so that the filar guide 209 is aligned with the portion to be wound of the workpiece. In some embodiments, the multi-filar guide radial telescopic portion 3 may drive the filar guide 209 to extend to an appropriate position, the filar guide 209 may be aligned with the portion to be wound of the workpiece, and the multi-filar guide rotation portion 2 may drive a plurality of filar guides 209 to rotate, and multi-filaments may be wound on the outer wall of the workpiece at the same time. Further, as the portion to be wound of the workpiece changes, the multi-filar guide radial telescopic portion 3 may drive the filar guide 209 to perform telescopic movement, to adjust the relative position of the filar guide 209 and the workpiece.

Figure 2:
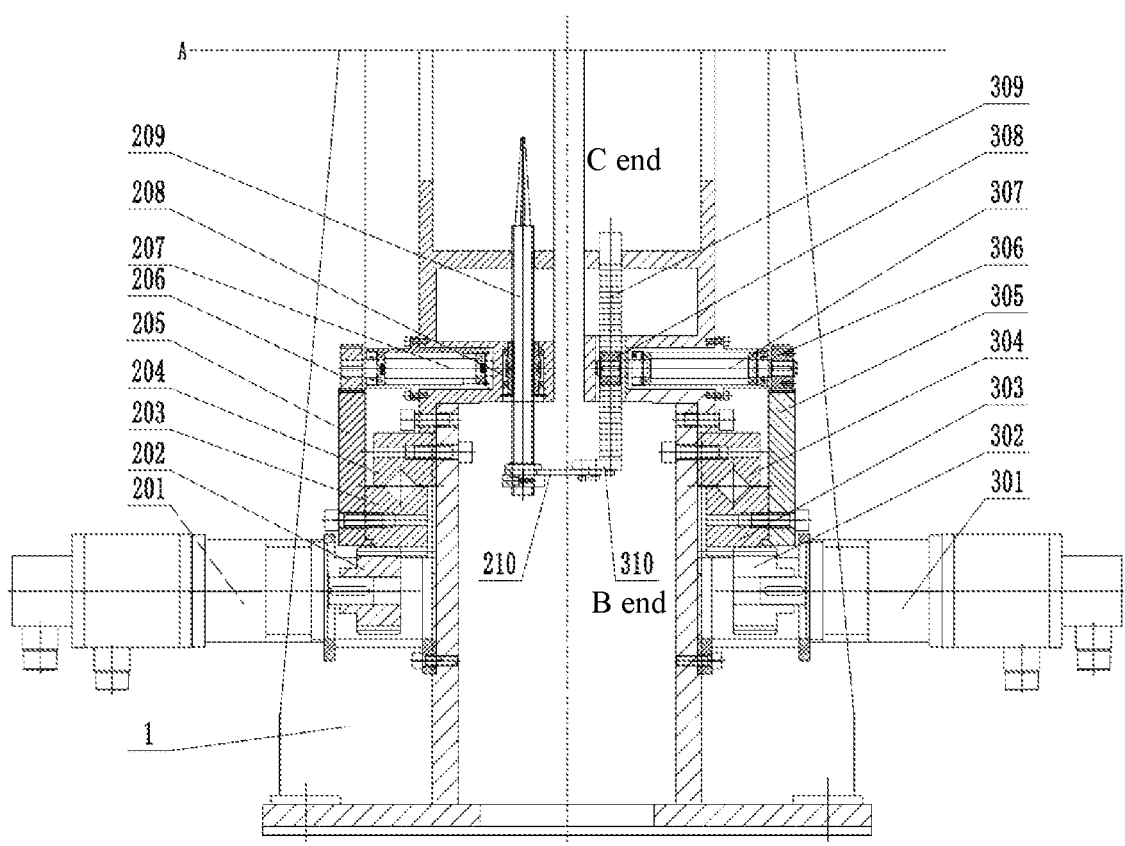
FIG. 2 is a sectional view of a multi-filament helical winding device according to some embodiments of the present disclosure.

FIG. 2 is a sectional view of a multi-filament helical winding device according to some embodiments of the present disclosure.

As shown in FIG. 2, in some embodiments, the first telescopic mechanism may include a second driving portion 301, a first transmission mechanism, and a first shifting fork 310. The first rotation mechanism may include a first driving portion 201, a second transmission mechanism, a filar guide 209, and a first clamp 210. The first telescopic mechanism may drive the filar guide 209 to perform telescopic movement through the first transmission mechanism by the second driving portion 301. The first rotation mechanism may drive the filar guide 209 to rotate through the second transmission mechanism by the first driving portion 201. The first shifting fork 310 of the first telescopic mechanism may be connected to the first clamp 210 of the first rotation mechanism.

In some embodiments, the first telescopic mechanism may independently control the filar guide 209 to perform telescopic movement, and the first rotation mechanism may independently control the filar guide 209 to rotate. In some embodiments, the first telescopic mechanism and the first rotation mechanism may be simultaneously controlled by two control systems, which are independent of each other.

In some embodiments, the first shifting fork 310 of the first telescopic mechanism may be connected to the first clamp 210 of the first rotation mechanism, and the filar guide may be both rotated and performed radially telescopic movement through the connection of a plurality of clamps and shifting forks.

In some embodiments, as shown in FIG. 2, the first transmission mechanism may include a third gear 302, a second big outer ring gear 303, a second inner support ring 304, a second big inner ring gear 305, a fourth gear 306, a second shaft 307, a fifth gear 308, and a rack 309. An output shaft of the second driving portion 301 may be connected to the third gear 302, and the third gear 302 may be meshed with the second big outer ring gear 303. The second big outer ring gear 303 may be connected to the second inner support ring 304. The second inner support ring 304 and the frame may be fixed through a thread connection, and the second big outer ring gear 303 and the second big inner ring gear 305 may be fixed through the thread connection. The second big inner ring gear 305 may be meshed with the fourth gear 306. The fourth gear 306 may be connected to the second shaft 307, and the second shaft 307 may be connected to the fourth gear 308. The fifth gear 308 may be meshed with the rack 309. One end of the rack 309 may be mounted in a slideway of the frame 1, and other end of the rack 309 may be provided with the first shifting fork 310.

In some embodiments, the second transmission mechanism may include a first gear 202, a first big outer ring gear 203, a first inner support ring 204, a first big inner ring gear 205, a second gear 206, a first shaft 207, and a first worm gear 208. The first driving portion 201 may be mounted in the frame 1. An output shaft of the first driving portion 201 may be connected to the first gear 202 by the key and the keyway. The first gear 202 may be meshed with the first big outer ring gear 203. The first big outer ring gear 203 may be connected to the first inner support ring 204, and the first inner support ring 204 and the frame 1 may be fixed through the thread connection. The first big outer ring gear 203 and the first big inner ring gear 205 may be fixed through the thread connection. The first big inner ring gear 205 may be meshed with the second gear 206, and the second gear 206 and the first shaft 207 may be connected by the key and the keyway. One end of the first shaft 207 may be processed into a worm. The worm of the first shaft 207 may be connected to the first worm gear 208. The first worm gear 208 may be connected to the filar guide 209 through a spline, and the first clamp 210 may be mounted at end of the filar guide 209.

In some embodiments, the first driving portion 201 of the first rotation mechanism may independently control the filar guide 209 to rotate, and the second driving portion 301 of the first telescopic mechanism may independently control the filar guide 209 to perform telescopic movement, which may adjust the filar guide 209, so that the filar guide 209 may be aligned with the portion to be wound of the workpiece. Further, the first driving portion 201 of the first rotation mechanism and the second driving portion 301 of the first telescopic mechanism may be controlled simultaneously, and the two control systems may be independent of each other and do not interfere with each other. In some embodiments, while driving the filar guide 209 to rotate, the filar guide 209 may be driven to perform telescopic movement radially, and the relative position of the filar guide 209 and the workpiece may be adjusted, so that the filaments on the outer wall of the workpiece may be wound more evenly.

Taking an inner bottle (or other workpieces) as an example, it may be wound from the position of the bottle mouth of the inner bottle, and gradually wound to the position of the bottom of the bottle, since a diameter of the bottle mouth is constantly changing from small to large, to ensure the winding uniformity, the contact area between each filament bundle and the liner also gradually increases. When the transition from the bottle mouth to the bottle body is completed, the contact area between the filament and the liner is the largest. In some embodiments, to make the filament winding more uniform, the filar guide 209 may be driven to perform telescopic movement through the first telescopic mechanism, and the relative position of the filar guide 209 and the liner may be adjusted.

In a specific embodiment, when the position of the bottle mouth is wound, the output shaft of the second driving portion 301 may start to rotate forward, so that the third gear 302 may start to rotate, and the third gear 302 may be meshed with the second big outer ring gear 303, so the big outer ring gear and the second gear 303 may start to rotate synchronously. The second big inner ring gear 305 and the second big outer ring gear 303 may be relatively fixed and rotate together. At this time, since the fourth gear 306 is meshed with the second big inner ring gear 305, the fourth gear 306 drives the second shaft 307 to rotate together, and the fifth gear 308 mounted on the second shaft 308 starts to rotate, driving the rack 309 to advance toward the C end.

During the movement of the rack 309, the first shifting fork 310 mounted on the B end of the rack 309 drives the first clamp 210 to move, with the movement of the first clamp 210, the filar guide 209 starts to move toward the C end, when the filar guide 209 moves to an appropriate position, the second driving portion 301 stops rotating, and the filar guide 209 stops performing telescopic movement.

In some embodiments, after the filar guide 209 is retracted to an appropriate position, the first rotation mechanism may drive the filar guide 209 to rotate, drive the liner to perform axial movement and circumferential rotation, and start to wind the filaments around the bottle mouth of the liner. During the winding process, the output shaft of the second driving portion 301 may start to rotate in the reverse direction. The rotation speed may be controlled to make the filar guide 209 retract according to the change of the curvature radius of the liner head. The rotation speed of the first driving portion 201 may be controlled, so that the filar guide 209 rotates according to the change of the curvature radius of the liner head. At this time, the filar guide 209 both rotates and retracts radially.

In a specific embodiment, during the filament winding process, the output shaft of the first driving portion 201 may start to rotate forward, so that the second gear 202 may start to rotate. The second gear 202 may be meshed with the first big outer ring gear 203, so first big outer ring gear 203 may rotate simultaneously, and the first big inner ring gear 205 and the first big outer ring gear 203 may be relatively fixed and rotate together. At this time, since the second gear 206 is meshed with the first big inner ring gear 205, the second gear 206 drives the first shaft 207 to rotate together, and the right end of the first shaft 207 is processed into a worm, which may drive the first worm gear 208 to rotate. As the first worm gear 208 rotates, since the filar guide 209 and the first worm gear 208 are connected by splines, the filar guide 209 also starts to rotate.

In some embodiments, when winding to the transitional position between the bottle mouth and the bottle body, the filar guide 209 may retract to a maximum position, and the contact area between the filaments and the liner may be the largest. At this time, the first driving portion 201 and the second driving portion 301 stop rotating. Continuing to drive the liner to move axially and rotate circumferentially, and helically wind the bottle body, at this stage, the filar guide 209 does not move.

In some embodiments, after the winding of the bottle body is completed, at the transitional position between the bottle body at other end and the head, the output shaft of the second driving portion 301 may start to rotate in the forward direction, and the rotation speed may be controlled so that the filar guide 209 extends out according to the change of the curvature radius of the liner head. At the same time, the output shaft of the first driving portion 201 may start to rotate forward, and the speed of the first driving portion 201 may be controlled, so that the filar guide may rotate according to the change of the curvature radius of the liner head. At this time, the filar guide 209 both rotates and extends out radially. The helical winding of the liner at the other end is completed with cooperation with the axial movement and circumferential rotation of the liner, thereby completing the helical winding operation of the first layer of the liner.

In some embodiments, the filar guides 209 may be evenly distributed in the circumference around the third shaft (axis A as shown in FIG. 2), and the plurality of filar guides 209 may synchronously perform radially telescopic movement and rotate around the shaft. Multi-filaments may be wound on the outer wall of the workpiece at the same time to improve efficiency. In some embodiments, since filament is generally flat, the filar guide 209 may be provided with a corresponding flat shape.

In some embodiments, the second big outer ring gear 303 and the second inner support ring 304 may be coaxially mounted, the first big outer ring gear 203 and the first inner support ring 204 may be coaxially mounted, and the coaxial mounting may make the two coaxially rotate, so that the filar guide 209 may rotate more stably and smoothly.

In some embodiments, the output shaft of the second driving portion 301 and the third gear 302 may be connected by the key and the keyway. The fourth gear 306 and the second shaft 307 may be connected by the key and the keyway. The second shaft 307 and the fifth gear 308 may be connected by the key and the keyway. The connection of the key and the keyway may make the output shaft and the gear more stable, thereby avoiding falling off during the rotation.

In some embodiments, a plurality of first telescopic mechanisms and first rotation mechanisms evenly distributed in the circumference around the first shaft may be connected to the shifting fork through the clamp, so that the filar guide may rotate or perform radially telescopic movement. The first telescopic mechanisms and first rotation mechanisms may be powered and controlled by the first driving portion and the second driving portion respectively, and finally multiple filar guides may be caused to rotate and perform radially telescopic movement synchronously, so as to realize the synchronous helical winding of multi-filaments in a single layer, which greatly improves production efficiency and avoids the phenomenon of single or few filament bundle crossing caused by the winding of single or few filament bundle, greatly reduces the phenomenon of stress concentration, improves the mechanical properties of the molded product, and greatly prolongs the life.

Figure 3:
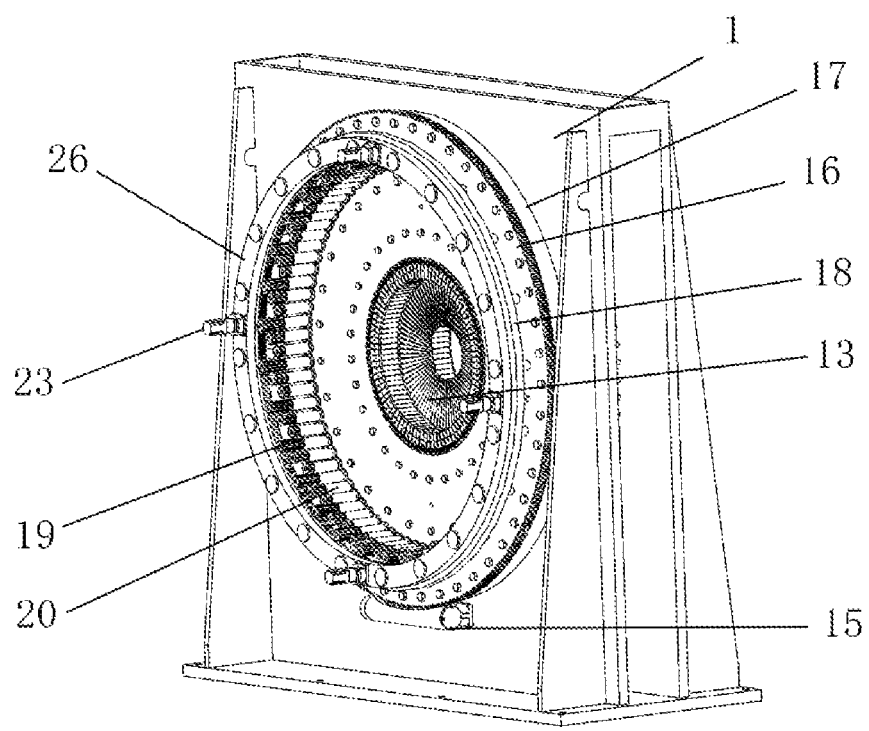
FIG. 3 is a structural diagram of a multi-filament helical winding device according to some embodiments of the present disclosure.
Figure 4:
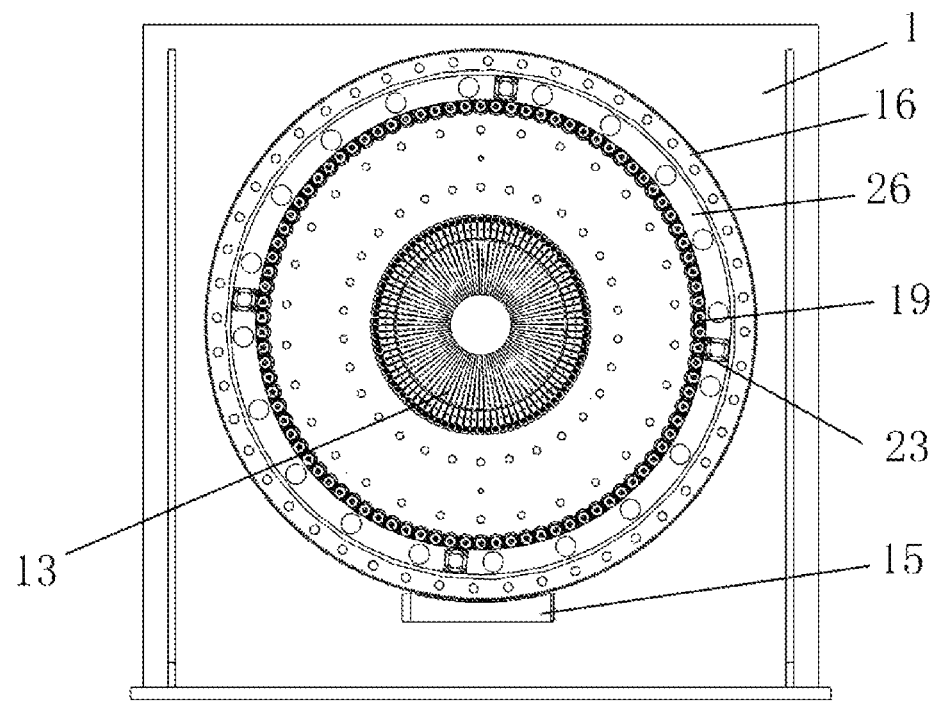
FIG. 4 is a front view of the multi-filament helical winding device shown in FIG. 3.
Figure 5:
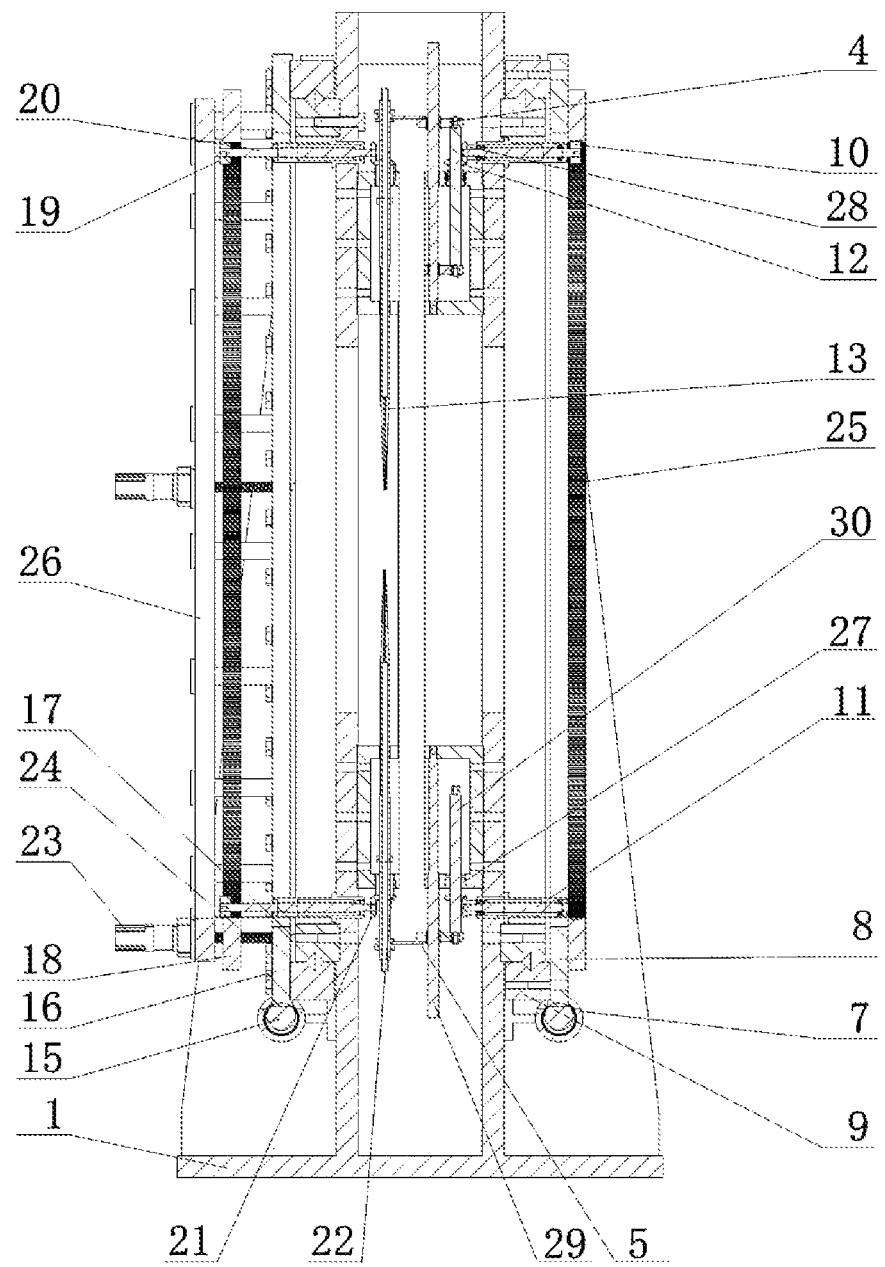
FIG. 5 is a sectional view of the multi-filament helical winding device shown in FIG. 3.
Figure 6:
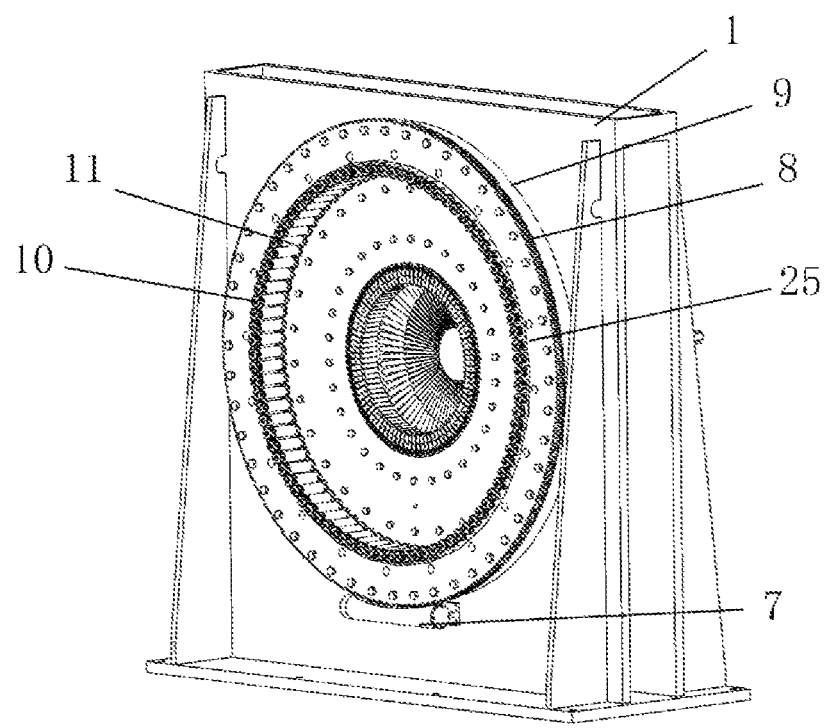
FIG. 6 is a structural diagram of another perspective of the multi-filament helical winding device shown in FIG. 3.
Figure 7:
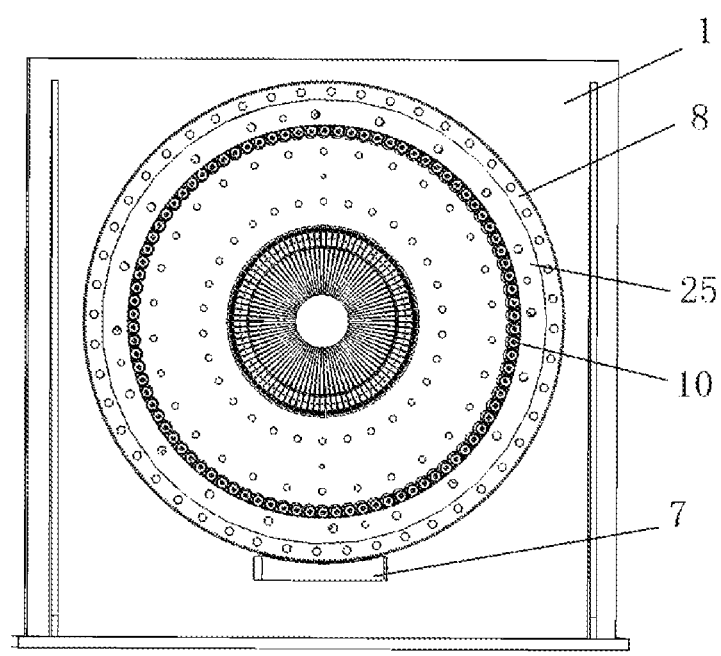
FIG. 7 is a front view of the multi-filament helical winding device shown in FIG. 6.
Figure 8:
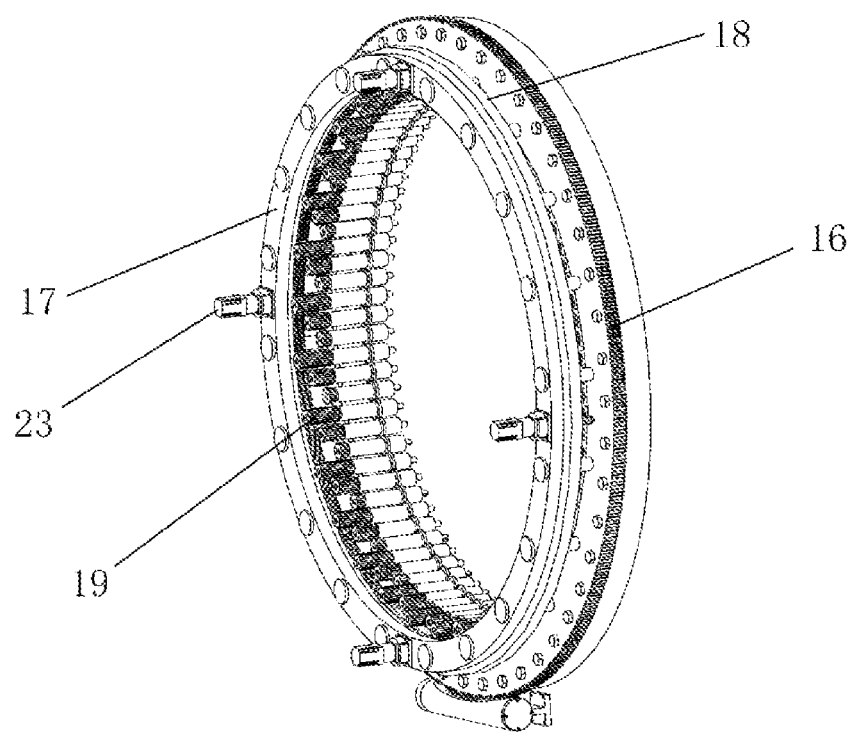
FIG. 8 is a structural diagram of a multi-filar guide radial telescopic portion and a multi-filar guide rotation portion according to some embodiments of the present disclosure.

FIG. 3 is a structural diagram of a multi-filament helical winding device according to some embodiments of the present disclosure. FIG. 4 is a front view of the multi-filament helical winding device shown in FIG. 3. FIG. 5 is a sectional view of the multi-filament helical winding device shown in FIG. 3. FIG. 6 is a structural diagram of another perspective of the multi-filament helical winding device shown in FIG. 3. FIG. 7 is a front view of the multi-filament helical winding device shown in FIG. 6. FIG. 8 is a structural diagram of a multi-filar guide radial telescopic portion and a multi-filar guide rotation portion according to some embodiments of the present disclosure.

As shown in FIGS. 3 and 4, in some embodiments, the second telescopic mechanism may include a plurality of filar guide radial telescopic mechanisms. The plurality of the filar guide radial telescopic mechanisms may be evenly distributed in a circumference on the frame 1. The filar guide radial telescopic mechanism may include a third driving portion, a third transmission mechanism, and a second clamp 4. The second rotation mechanism may include a plurality of filar guide circumferential rotation mechanisms, which are evenly distributed in the circumference on the frame 1. The filar guide circumferential rotation mechanism may include a filar guide 13, a fourth driving portion 14, a fourth transmission mechanism, and a second shifting fork 5. The second telescopic mechanism may drive the filar guide 13 to perform telescopic movement through the third transmission mechanism by the third driving portion. The second rotation mechanism may drive the filar guide 13 to rotate through the fourth transmission mechanism by the fourth driving portion 14.

In some embodiments, the second telescopic mechanism may independently control the filar guide 13 to perform telescopic movement, and the second rotation mechanism may independently control the filar guide 13 to rotate. The second telescopic mechanism and the second rotation mechanism may be respectively controlled by two control systems at the same time, and the two control systems may be independent of each other and do not interfere with each other.

In some embodiments, a count of the filar guide radial telescopic mechanism may be the same as a count of the filar guide circumferential rotation mechanism, and the filar guide radial telescopic mechanism may correspond to the filar guide circumferential rotation mechanism one by one. The filar guide radial telescopic mechanism may be parallel to the filar guide circumferential rotation mechanism, and the second shifting fork 5 of the filar guide circumferential rotation mechanism may be connected to the second clamp 4 of the filar guide radial telescopic mechanism.

Since the sixth gear 10 and the seventh gear 19, which are meshed with the third big inner ring gear 25 and the second big inner ring gear 16, are evenly arranged in the circumference and the number of the sixth gear 10 and the seventh gear 19 is maximized, each pair of the sixth gear 10 and the seventh gear 19 may drive a filar guide correspondingly, so under the action of the third big inner ring gear 25 and the second big inner ring gear 16, the plurality of filar guides 13 may be driven to perform telescopic movement and circumferential rotation synchronously.

In some embodiments, as shown in FIG. 5, the third transmission mechanism may include a first worm 7, a third big outer ring gear 8, a first rotary structure member 9, a third big inner ring gear 25, a sixth gear 10, a fourth shaft 11, a first bevel gear 28, a second bevel gear 12, a screw rod 30, a sixth shaft 29, and a screw nut 27. The third driving portion may be mounted in the frame 1. An output shaft of the third driving portion and the first worm 7 may be connected by the key and the keyway or other means. The first worm 7 may be meshed with the third big outer ring gear 8. The third big outer ring gear 8 may be mounted coaxially with the first rotary structure member 9. The first rotary structure member 9 and the frame 1 may be fixed through a thread connection.

The third big outer ring gear 8 and the third big inner ring gear 25 may be fixed through a thread connection. The third big inner ring gear 25 may be meshed with the sixth gear 10. The sixth gear 10 and the fourth shaft 11 may be connected by the key and the keyway. Other end of the fourth shaft 11 may be connected to the first bevel gear 28. The first bevel gear 28 may be meshed with the second bevel gear 12. The second bevel gear 12 and the screw rod 30 may be connected by the spline. Ends of the sixth shaft 29 may be provided with a second clamp 4, and the screw nut 27 and the second bevel gear 12 may be fixedly mounted.

In some embodiments, the third driving portion may drive the first worm 7 to rotate, and the first worm 7 and the third big outer ring gear 8 may be meshed with each other, thereby driving the third big outer ring gear 8 to rotate. The third big outer ring gear 8 and the third big inner ring gear 25 may be fixed to each other, thereby driving the third big inner ring gear 25 to rotate circumferentially. The third big inner ring gear 25 may be meshed with the sixth gear 10, thereby driving the sixth gear 10 to rotate circumferentially. The sixth gear 10 and the first bevel gear 28 may be mounted on the same shaft, thereby driving the first bevel gear 28 to rotate circumferentially. The first bevel gear 28 may be meshed with the second bevel gear 12, thereby driving the second bevel gear 12 to rotate. The second bevel gear 12 may be fixed with the screw nut 27, and the screw nut 27 and the screw rod 30 may be connected by the thread connection. The screw rod 30 may be mounted in parallel with the sixth shaft 29. Under the action of the second bevel gear 12, the screw rod 30 may move along the sixth shaft 29. The second clamp 4 may be mounted at the end of the sixth shaft 29, so that the second clamp 4 may be driven to move.

In some embodiments, a second shifting fork 5 may be mounted at the end of the filar guide 13, and the second shifting fork 5 may be mounted in the groove of the second clamp 4. The second shifting fork 5 may be driven to move with the second clamp 4 moving, thereby driving the filar guide 13 to move radially.

In some embodiments, as shown in FIG. 7, the fourth transmission mechanism may include a second worm 15, a fourth big outer ring gear 16, a second rotary structure member 17, a fourth big inner ring gear 18, a guide ring of the fourth big inner ring gear ring 26, a seventh gear 19, a fifth shaft 20, a third bevel gear 21, a fourth bevel gear 22, a motor 23, and a ball screw 24. The fourth driving portion 14 may be mounted in the frame 1. An output shaft of the fourth driving portion 14 may be connected to the second worm 15 through the key and the keyway. The second worm 15 may be meshed with the fourth big outer ring gear 16. The fourth big outer ring gear 16 and the second rotating structure member 17 may be mounted coaxially. The second rotating structure member 17 and the frame 1 may be fixed through a thread connection, to ensure the rotary motion of the fourth big outer ring gear 16. A plurality of shafts may be processed along the circumference in a direction perpendicular to a surface of the guide ring of the fourth big inner ring gear ring 26. The fourth big inner ring gear 18 and the guide ring of the fourth big inner ring gear ring 26 may be mounted coaxially. As shown in FIG. 8, the motor 23 may be mounted on the fourth big inner ring gear 18, the motor 23 may be connected to the ball screw 24, the motor 23 may drive the ball screw 24 to rotate, the ball screw 24 may drive the fourth big inner ring gear 18 to reciprocate along a guide shaft, the fourth big inner ring gear 18 may be meshed with the seventh gear 19, the seventh gear 19 may be evenly distributed in the circumference, so the fourth big inner ring gear 18 may be meshed with different counts of the seventh gear 19 at different positions of the guide shaft is ensured, thereby driving different counts of filar guides 13 to perform telescopic movement. The seventh gear 19 and the fifth shaft 20 may be connected by the key and the keyway. Other end of the fifth shaft 20 may be provided with the third bevel gear 21. The third bevel gear 21 may be meshed with the fourth bevel gear 22. The fourth bevel gear 22 may be mounted in the filar guide 13 and ends of the filar guide 13 may be provided with the second shifting fork 5.

In some embodiments, the fourth driving portion may drive the second worm 15 to rotate. Since the second worm 15 and the fourth big outer ring gear 16 may be meshed with each other, the fourth big outer ring gear 16 may be driven to rotate. Since the fourth big outer ring gear 16 may be fixed to the fourth big inner ring gear 18, thereby the fourth big inner ring gear 18 may be driven to rotate. The fourth big inner ring gear 18 and the seventh gear 19 may be meshed with each other, so driving seventh gear 19 to rotate circumferentially. Since the seventh gear 19 and the third bevel gear 21 may be coaxially mounted, the third bevel gear 21 may be driven to rotate. The third bevel gear 21 may be meshed with the fourth bevel gear 22, thereby driving the fourth bevel gear 22 to rotate. The filar guide 13 may be mounted in the fourth bevel gear 22, thereby driving the filar guide 13 to rotate circumferentially.

In some embodiments, the seventh gear 19 may be gears with different gear widths.

In some embodiments, the fifth shaft 20 and the third bevel gear 21 may be connected by the key and the keyway.

In some embodiments, both the third driving portion and the fourth driving portion may use servo motors. In some embodiments, the third driving portion may independently control the filar guide 13 to perform circumferential rotation, and the fourth driving portion may independently control the filar guide 13 to perform telescopic movement. In some embodiments, the third driving portion and the fourth driving portion may be controlled by two control systems at the same time, and the two control systems may be independent of each other and do not interfere with each other.

Figure 9:
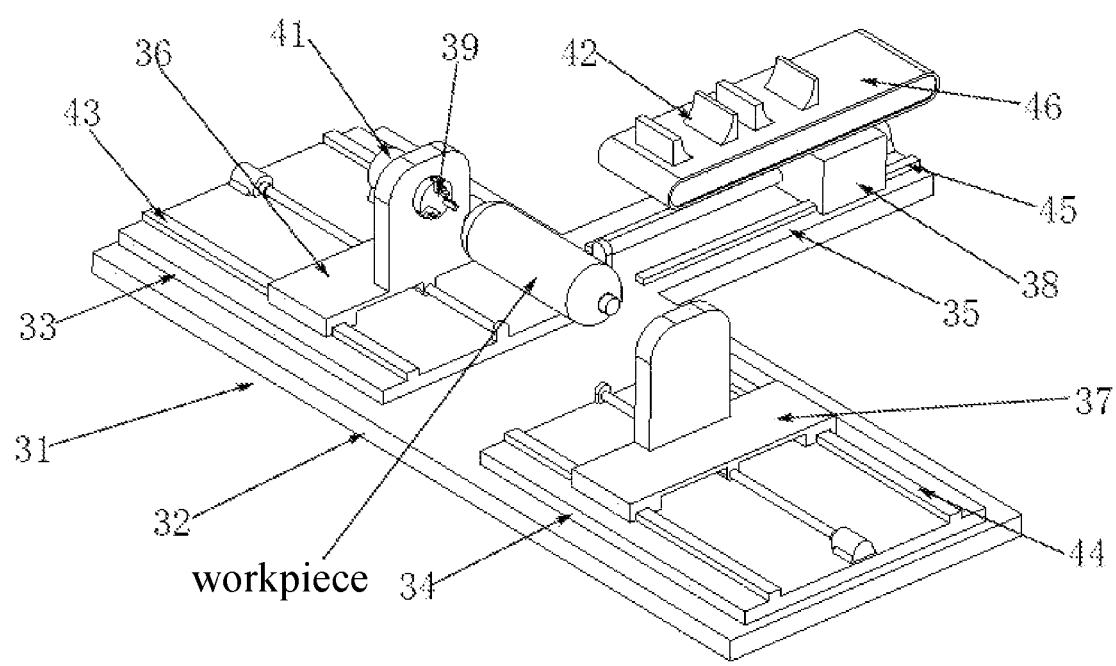
FIG. 9 is a structural diagram of a fixing device of a multi-filament helical winding device according to some embodiments of the present disclosure.

FIG. 9 is a structural diagram of a fixing device of a multi-filament helical winding device according to some embodiments of the present disclosure.

In some embodiments, as shown in FIG. 9, a bottom of the frame 1 may be provided with a fixing device 31, the fixing device 31 may include a base 32, a first movable seat 33, a second movable seat 34, a third movable seat 35, a first traveling mechanism 36, a second traveling mechanism 37, a third traveling mechanism 38, a first gripper 39, a second gripper 40, a rotating motor 41, a buckle 42, a first guide rail 43, a second guide rail 44, a third guide rail 45, and a conveyor belt 46. The frame 1 may be fixed on the base 32, and the first movable seat 33 and the second movable seat 34 may be respectively fixed on both sides of the frame 1. The first movable seat 33 may be provided with the first guide rail 43. The first travelling mechanism 36 may be slidably connected to the first guide rail 43. The first movable seat 33 may be connected to the first travelling mechanism 36 through worm gears. The first travelling mechanism 36 may be provided with the first gripper 39, and the first gripper 39 may be fixedly connected to a rotating shaft of the rotating motor 41. The second movable seat 34 may be provided with the second guide rail 44. The second travelling mechanism 37 may be slidably connected to the second guide rail 44, and the second movable seat 34 may be connected to the second travelling mechanism 37 through the worm gears. The second travelling mechanism 37 may be provided with the second gripper 40, and a workpiece may be clamped between the first gripper 39 and the second gripper 40.

In some embodiments, the third movable seat 35 may be arranged on one side of the first movable seat 33 and one side of the second movable seat 34. The third movable seat 35 may be provided with the third guide rail 45. A direction of the first guide rail 43 may be the same as a direction of the second guide rail 44, and the direction of the first guide rail 43 may be perpendicular to the direction of the third guide rail 45. The third travelling mechanism 38 may be slidably connected to the third guide rail 45. The third travelling mechanism 38 may be provided with the conveyor belt 46, and the conveyor belt 46 may be provided with the buckle 42.

In some embodiments, the buckle 42 on the conveyor belt 46 may be used to place the workpiece, and the workpiece is moved to one side of the first travelling mechanism 36 and the second travelling mechanism 37 by the third travelling mechanism 38. The workpiece may be moved to the position between the first gripper 39 and the second gripper 40 by the conveyor belt 46. The first travelling mechanism 36 and the second travelling mechanism 37 may move toward the workpiece respectively, thereby driving the first gripper 39 and the second gripper 40 to tighten the workpiece.

In some embodiments, a plurality of first telescopic mechanisms and first rotation mechanisms may be evenly distributed in the circumference around the first shaft are connected to the shifting fork through the clamp, so that the filar guide may rotate or perform radially telescopic movement. The first telescopic mechanisms and first rotation mechanisms may be powered and controlled by the different driving portion respectively, and finally it may be possible to flexibly control the synchronous rotation and radially telescopic movement of multiple filar guides according to the size of the pressure vessel, which realizes the synchronous helical winding of multi-filaments in a single layer, greatly improves production efficiency and avoids the phenomenon of single or few filament bundle crossing caused by the winding of single or few filament bundle, greatly reduces the phenomenon of stress concentration, improves the mechanical properties of the molded product, and greatly prolongs the life. In addition, through the variable driving, the count of the filar guide that moves may be flexibly controlled according to the size of the winding structure member, so that the device may be applied to multi-size winding, which fully plays the versatility of the device.

In some embodiments, the multi-filament helical winding device may further include a control system, which may control the multi-filar guide radial telescopic portion and the multi-filar guide rotation portion respectively, so that the filar guide may perform telescopic movement and rotation respectively, which do not affect each other. In some embodiments, the control system may include a controller, a displacement sensor, and an angle sensor, and the displacement sensor and the angle sensor may be in communication with the controller. The displacement sensor may measure the telescopic movement of the filar guide, and the angle sensor may measure the rotation of the filar guide. The controller may receive the information detected by the displacement sensor and the angle sensor, and based on the processing of the detected information, send control instructions to the multi-filar guide radial telescopic portion and the multi-filar guide rotation portion to control the movement of the filar guide accordingly.

In some embodiments, the control system may predict the position of the filar guide based on the parameters of the workpiece, the displacement information of the filar guide, and the angle information of the filar guide. In some embodiments, the prediction of the position of the filar guide may be determined based on a prediction model, which may be a machine learning model. An input of the prediction model may include the parameters of the workpiece, the displacement information and the angle information of the current and previous (or multiple previous time points) the filar guide, and an output may include subsequent (time points in the future) position information of the filar guide.

In some embodiments, the control system may also determine a risk probability of unqualified winding based on the predicted position of the filar guide determined by the prediction model, the unqualified winding including filament winding stack, uneven spacing between the filaments, or the like.

In some embodiments, the prediction model may include a feature layer, a sequence layer, and a first prediction layer. An input of the feature layer may include parameters of the workpiece, and an output of the feature layer may be a feature vector of the workpiece. An input of the sequence layer is the displacement information and the angle information of the current and previous (or multiple time points previous) the filar guide, and an output of the sequence layer is a sequence feature of the position. An input of the first prediction layer is the feature vector of the workpiece and the sequence feature of the position, and an output of the first prediction layer is subsequent position information of the filar guide. In some embodiments, the prediction model may further include a second prediction layer, an input of the second prediction layer may be the sequence feature of the position and the subsequent position information of the guidewire output from the first prediction layer, and an output may be the risk probability of unqualified winding.

In some embodiments, the prediction model may be obtained from a plurality of first training samples and the labels. The first training samples may include the parameters of the sample workpiece, the displacement information, and angle information of the sample filar guide at multiple time points, and the labels of the first training samples may be whether the sample winding is qualified and the position of the sample filar guide at the time points after multiple time points. For example, the plurality of first training samples and the labels may be input into an initial prediction model, a loss function may be constructed based on the labels and the prediction results of the initial prediction model, and the parameters of the initial prediction model may be iteratively updated based on the loss function, and a training of the initial prediction model is completed when the loss function satisfies a preset condition, where the preset condition may be that the loss function converges, the number of iterations reaches a threshold, or the like. In some embodiments, the first training samples may be obtained based on historical production data of the device.

In some embodiments, in response to determination that the risk probability of unqualified winding is larger than a threshold, the control system may send an early warning message to remind manual adjustment. In some embodiments, the control system may further determine adjustment parameters of the multi-filar guide radial telescopic portion and the multi-filar guide rotation portion through an adjustment model and send control instructions to the multi-filar guide radial telescopic portion and the multi-filar guide rotation portion based on the adjustment parameters.

In some embodiments, the adjustment model may be a machine learning model, an input of the adjustment model may be preset adjusted operation parameters of the multi-filar guide radial telescopic portion and the multi-filar guide rotation portion, the parameters of the workpiece, the displacement information and the angle information of the current and previous (or multiple time points previous) filar guide, and an output of the adjustment model is the risk probability of unqualified winding. A control instruction may be generated from the adjustment parameters corresponding to the risk probability of unqualified winding being less than the threshold.

In some embodiments, the adjustment model may be obtained from a plurality of second training samples and the labels. The second training samples may include the operation parameter of the multi-filar guide radial telescopic portion and the multi-filar guide rotation portion, the parameter of the sample workpiece, the displacement information and angle information of the sample filar guide at multiple time points. The labels of the second training samples may be whether the sample winding is qualified. In some embodiments, the second training samples may be obtained based on historical production data of the device.

The basic concepts have been described above, obviously, for those skilled in the art, the above detailed disclosure is merely a way of example, and does not constitute a limitation of the present disclosure. Although not explicitly described herein, various modifications, improvements, and corrections to the present disclosure may occur to those skilled in the art. Such modifications, improvements, and corrections are suggested in the present disclosure, so such modifications, improvements, and corrections still belong to the spirit and scope of the exemplary embodiments of the present disclosure.

Meanwhile, the present disclosure uses specific words to describe the embodiments of the present disclosure. Examples such as "one embodiment," "an embodiment," and/or "some embodiments" mean a certain feature, structure, or characteristic associated with at least one embodiment of the present disclosure. Therefore, it should be emphasized and noted that two or more references to "an embodiment" or "one embodiment" or "an alternative embodiment" in various places in the present disclosure are not necessarily referring to the same embodiment. Furthermore, certain features, structures or characteristics of the one or more embodiments of the present disclosure may be combined as appropriate.

It should be noted that to simplify the expressions disclosed in the present disclosure and thus help the understanding of one or more embodiments of the disclosure, in the foregoing description of the embodiments of the present disclosure, various features may sometimes be combined into one embodiment, drawings or descriptions thereof. However, this method of disclosure does not imply that the subject matter of the description requires more features than that are recited in the claims. Rather, claimed subject matter may lie in less than all features of a single foregoing disclosed embodiment.

Finally, it should be understood that the embodiments described in the present disclosure are only used to illustrate the principles of the embodiments of the present disclosure. Other deformations are also possible within the scope of the present disclosure. Therefore, merely by way of example and not limitation, alternative configurations of the embodiments of the present disclosure may be considered consistent with the teachings of the present disclosure. Accordingly, the embodiments of the present disclosure are not limited to those embodiments expressly introduced and described in the present disclosure.

What is claimed is:

1. A multi-filament helical winding device, comprising a frame, a multi-filar guide radial telescopic portion, a multi-filar guide rotation portion, wherein
   the multi-filar guide radial telescopic portion and the multi-filar guide rotation portion are arranged on the frame, and the multi-filar guide radial telescopic portion is connected to the multi-filar guide rotation portion;
   a count of the multi-filar guide radial telescopic portion is the same as a count of the multi-filar guide rotation portion, and the multi-filar guide radial telescopic portion corresponds to the multi-filar guide rotation portion one by one;
   the multi-filar guide radial telescopic portion includes a first telescopic mechanism or a second telescopic mechanism; and
   the multi-filar guide rotation portion includes a first rotation mechanism or a second rotation mechanism; wherein
   the first telescopic mechanism includes a second driving portion, a first transmission mechanism, and a first shifting fork, and the first rotation mechanism includes a first driving portion, a second transmission mechanism, a filar guide, and a first clamp,
   the first telescopic mechanism drives the filar guide to perform telescopic movement through the first transmission mechanism by the second driving portion, the first rotation mechanism drives the filar guide to rotate through the second transmission mechanism by the first driving portion; and
   the first shifting fork of the first telescopic mechanism is connected to the first clamp of the first rotation mechanism.

2. The device of claim 1, wherein the first transmission mechanism includes a third gear, a second big outer ring gear, a second inner support ring, a second big inner ring gear, a fourth gear, a second shaft, a fifth gear, and a rack, an output shaft of the second driving portion is connected to the third gear, the third gear is meshed with the second big outer ring gear, the second big outer ring gear is connected to the second inner support ring, the second inner support ring and the frame are fixed through a thread connection, the second big outer ring gear and the second big inner ring gear are fixed through the thread connection, the second big inner ring gear is meshed with the fourth gear, the fourth gear is connected to the second shaft, the second shaft is connected to the fourth gear, the fifth gear is meshed with the rack, one end of the rack is mounted in a slideway of the frame, and other end of the rack is provided with the first shifting fork.

3. The device of claim 2, wherein the second big outer ring gear and the second inner support ring are mounted coaxially, and a first big outer ring gear and a first inner support ring are mounted coaxially.

4. The device of claim 2, wherein the output shaft of the second driving portion and the third gear are connected by a key and a keyway, the fourth gear and the second shaft are connected by the key and the keyway, and the second shaft and the fifth gear are connected by the key and the keyway.

5. The device of claim 1, wherein the second transmission mechanism includes a first gear, a first big outer ring gear, a first inner support ring, a first big inner ring gear, a second gear, a first shaft, and a first worm gear, the first driving portion is mounted in the frame, an output shaft of the first driving portion is connected to the first gear by a key and a keyway, the first gear is meshed with the first big outer ring gear, the first big outer ring gear is connected to the first inner support ring, the first inner support ring and the frame are fixed through a thread connection, the first big outer ring gear and the first big inner ring gear are fixed through the thread connection, the first big inner ring gear is meshed with the second gear, the second gear and the first shaft is connected by a key and a keyway, one end of the first shaft is processed into a worm, the worm of the first shaft is connected to the first worm gear, and the first worm gear is connected to the filar guide through a spline, and the first clamp is mounted at end of the filar guide.

6. The device of claim 1, wherein the second telescopic mechanism includes a plurality of filar guide radial telescopic mechanisms, the plurality of the filar guide radial telescopic mechanisms are evenly distributed on the frame in a circumference, each filar guide radial telescopic mechanism in the plurality of the filar guide radial telescopic mechanisms includes a third driving portion, a third transmission mechanism, and a second clamp;

the second rotation mechanism includes a plurality of filar guide circumferential rotation mechanisms, the plurality of filar guide circumferential rotation mechanisms are evenly distributed on the frame in the circumference, and each filar guide circumferential rotation mechanism in the plurality of filar guide circumferential rotation mechanisms includes a filar guide, a fourth driving portion, a fourth transmission mechanism, and a second shifting fork;

the second telescopic mechanism drives the filar guide to perform telescopic movement through the third transmission mechanism by the third driving portion, and the second rotation mechanism drives the filar guide to rotate through the fourth transmission mechanism by the fourth driving portion; and the filar guide radial telescopic mechanism is parallel to the filar guide circumferential rotation mechanism, and the second shifting fork of the filar guide circumferential rotation mechanism is connected to the second clamp of the filar guide radial telescopic mechanism.

7. The device of claim 6, wherein the third transmission mechanism includes a first worm, a third big outer ring gear, a first rotary structure member, a third big inner ring gear, a sixth gear, a fourth shaft, a first bevel gear, a second bevel gear, a screw rod, a sixth shaft, and a screw nut; the third driving portion is mounted in the frame, and an output shaft of the third driving portion and the first worm are connected by a key and a keyway or other means, the first worm is meshed with the third big outer ring gear, the third big outer ring gear is mounted coaxially with the first rotary structure member, the first rotary structure member and the frame are fixed through a thread connection, the third big outer ring gear and the third big inner ring gear are fixed through the thread connection, the third big inner ring gear is meshed with the sixth gear, the sixth gear and the fourth shaft are connected by the key and the keyway, other end of the fourth shaft is connected to the first bevel gear, the first bevel gear is meshed with the second bevel gear, the second bevel gear and the screw rod are connected by a spline, ends of the sixth shaft are provided with a second clamp, and the screw nut and the second bevel gear are fixedly mounted.

8. The device of claim 6, wherein the fourth transmission mechanism includes a second worm, a fourth big outer ring gear, a second rotary structure member, a fourth big inner ring gear, a guide ring of the fourth big inner ring gear ring, a seventh gear, a fifth shaft, a third bevel gear, a fourth bevel gear, a motor, and a ball screw; the fourth driving portion is mounted in the frame, an output shaft of the fourth driving portion is connected to the second worm through a key and a keyway, the second worm is meshed with the fourth big outer ring gear, the fourth big outer ring gear and the second rotary structure member are mounted coaxially, the second rotary structure member and the frame are fixed through a thread connection, a plurality of shafts are processed along the circumference in a direction perpendicular to a surface of the guide ring of the fourth big inner ring gear ring, the fourth big inner ring gear and the guide ring of the fourth big inner ring gear ring are mounted coaxially, the motor is mounted on the fourth big inner ring gear, the motor is connected to the ball screw, the motor drives the ball screw to rotate, the ball screw drives the fourth big inner ring gear to reciprocate along a guide shaft, the fourth big inner ring gear is meshed with the seventh gear, the seventh gear is evenly distributed in the circumference, the seventh gear and the fifth shaft are connected by the key and the keyway, other end of the fifth shaft is provided with the third bevel gear, the third bevel gear is meshed with the fourth bevel gear, the fourth bevel gear is mounted in the filar guide, and ends of the filar guide are provided with the second shifting fork.

9. The device of claim 8, wherein the seventh gear is a gear with different gear width.

10. The device of claim 8, wherein the fifth shaft and the third bevel gear are connected by the key and the keyway.

11. The device of claim 6, wherein both the third driving portion and the fourth driving portion use servo motors.

12. The device of claim 1, wherein a bottom of the frame is provided with a fixing device, the fixing device includes a base, a first movable seat, a second movable seat, a third movable seat, a first traveling mechanism, a second traveling mechanism, a third traveling mechanism, a first gripper, a second gripper, a rotating motor, a buckle, a first guide rail, a second guide rail, a third guide rail, and a conveyor belt, the frame is fixed on the base, the first movable seat and the second movable seat are respectively fixed on both sides of the frame, the first movable seat is provided with the first guide rail, the first travelling mechanism is slidably connected to the first guide rail, the first movable seat is connected to the first travelling mechanism through worm gears, the first travelling mechanism is provided with the first gripper, the first gripper is fixedly connected to a rotating shaft of the rotating motor, the second movable seat is provided with the second guide rail, the second traveling mechanism is slidably connected to the second guide rail, the second movable seat is connected to the second traveling mechanism through the worm gears, the second traveling mechanism is provided with the second gripper, a workpiece is clamped between the first gripper and the second gripper, the third movable seat is arranged on one side of the first movable seat and one side of the second movable seat, the third movable seat is provided with the third guide rail, a direction of the first guide rail is the same as a direction of the second guide rail, the direction of the first guide rail is perpendicular to the direction of the third guide rail, the third traveling mechanism is slidably connected to the third guide rail, the third travelling mechanism is provided with the conveyor belt, and the conveyor belt is provided with the buckle.

\* \* \* \* \*